US011788577B2

(12) United States Patent
Larsen et al.

(10) Patent No.: US 11,788,577 B2
(45) Date of Patent: Oct. 17, 2023

(54) ROTARY BEARING WITH A DAMPER AND A MOTOR AND A ROTARY ATOMIZER WITH SUCH BEARING, AND USE THEREOF

(71) Applicant: GEA Process Engineering A/S, Søborg (DK)

(72) Inventors: Jon Steffen Larsen, Søborg (DK); Jakob Nielsen, Køge (DK); Asger Hansen, Søborg (DK)

(73) Assignee: GEA Process Engineering A/S, Søborg (DK)

(*) Notice: Subject to any disclaimer, the term of this patent is extended or adjusted under 35 U.S.C. 154(b) by 85 days.

(21) Appl. No.: 17/428,448

(22) PCT Filed: Feb. 7, 2019

(86) PCT No.: PCT/DK2019/050046

§ 371 (c)(1),
(2) Date: Aug. 4, 2021

(87) PCT Pub. No.: WO2020/160734

PCT Pub. Date: Aug. 13, 2020

(65) Prior Publication Data

US 2022/0099141 A1 Mar. 31, 2022

(51) Int. Cl.

*F16C 27/04* (2006.01)
*F16C 19/06* (2006.01)

(52) U.S. Cl.

CPC ............ *F16C 27/045* (2013.01); *F16C 19/06* (2013.01); *F16C 2300/22* (2013.01)

(58) Field of Classification Search

CPC ...... F16C 19/06; F16C 25/083; F16C 27/045; F16C 27/08; F16C 2300/22;

(Continued)

(56) References Cited

U.S. PATENT DOCUMENTS 4,688,989 A 8/1987 Kondo et al.
4,713,146 A * 12/1987 Ek .......................... F16C 19/54 384/535

(Continued)

FOREIGN PATENT DOCUMENTS

DE 102016222030 A1 12/2017
EP 0644802 B1 3/1997

(Continued)

OTHER PUBLICATIONS

JPH109268_A_description.*

(Continued)

*Primary Examiner* — Phillip A Johnson
(74) *Attorney, Agent, or Firm* — Robinson & Cole LLP

(57) ABSTRACT

A rotary bearing with a damper having an inner bearing element configured for rotation around an axis of rotation, an outer bearing element coaxial with the inner bearing element, an inner damper element with an outer surface surrounding the outer bearing element, an outer damper element with an inner surface surrounding the inner damper element, at least one sealing element provided between the outer surface and the inner surface, the sealing element confining a damper space having a circumferential film space defined by a clearance between the outer surface and the inner surface. The damper space contains fluid and is a closed, isolated damper space.

23 Claims, 3 Drawing Sheets

(58) Field of Classification Search
CPC . F16C 2320/42; B05B 5/0415; B05B 5/1035; F01D 25/164
See application file for complete search history.

(56) References Cited

U.S. PATENT DOCUMENTS

| | | | | | |
|---|---|---|---|---|---|
| 4,781,077 | A | * | 11/1988 | El-Sahfei | F16F 15/10 464/180 |
| 4,992,024 | A | | 2/1991 | Heydrich | |
| 4,997,290 | A | * | 3/1991 | Aida | F01D 25/164 384/474 |
| 5,058,452 | A | | 10/1991 | El-Shafei | |
| 5,518,180 | A | * | 5/1996 | Svendsen | B05B 3/10 239/224 |
| 7,517,152 | B1 | | 4/2009 | Walsh | |
| 7,798,720 | B1 | | 9/2010 | Walsh | |
| 2014/0300231 | A1 | | 10/2014 | Delgado Marquez et al. | |
| 2017/0335767 | A1 | | 11/2017 | Gysling et al. | |

FOREIGN PATENT DOCUMENTS

| | | | | | |
|---|---|---|---|---|---|
| EP | 1184081 | B1 | | 7/2004 | |
| EP | 2826566 | A1 | | 1/2015 | |
| GB | 2175958 | A | * | 12/1986 | F01D 25/16 |
| JP | H109268 | A | * | 1/1998 | |
| JP | H1182498 | A | | 3/1999 | |
| JP | H11141545 | A | | 5/1999 | |
| KR | 20010065634 | A | | 7/2001 | |
| KR | 20180084634 | A | | 7/2018 | |
| WO | 2016022875 | A2 | | 2/2016 | |

OTHER PUBLICATIONS

International Search Report and Written Opinion issued in corresponding PCT Application No. PCT/DK2019/050046, dated Nov. 7, 2019, pp. 1-12.

* cited by examiner

ROTARY BEARING WITH A DAMPER AND A MOTOR AND A ROTARY ATOMIZER WITH SUCH BEARING, AND USE THEREOF

CROSS-REFERENCE TO RELATED APPLICATION

The instant application is a U.S. National Stage application of and claims priority to PCT/DK2019/050046, filed on Feb. 7, 2019, the subject matter of this application is hereby incorporated by reference in its entirety.

FIELD OF THE INVENTION

The present invention relates to a rotary bearing with a damper. The invention further relates to a motor and a rotary atomizer including such bearing with a damper, and to the use of such bearing with a damper.

BACKGROUND

In a rotary atomizer, in which the present invention inter alia is applicable, such as a rotary atomizer for a spray drying apparatus, liquid feed flow is directed to a rotating atomizer wheel, and at high peripheral speeds of the atomizer wheel, liquid disintegration occurs right at the atomizer wheel edge by frictional effects between air or gas and the liquid surface. The liquid emerges as a thin film from the channels or orifices of the atomizer wheel. Examples of such rotary atomizers and details of the atomizer wheel are shown in European Patent Nos. EP 0 644 802 B1 and EP 1 184 081 B1 (both to Niro).

The high peripheral speeds needed for rotating atomizer wheels inter alia pose a great demand on the bearings inter alia due to vibrations. Thus EP 2 826 566 A1 relates to the use of a foil bearing in a rotary atomizer.

According to EP 2 826 566 A1, and this is applicable to the present invention as well, the pattern of the droplets of atomized liquid depends upon several factors such as liquid properties, speed and configuration of the atomizer wheel, etc. Bulk density of the resulting powder is also one of the factors for spray dried products. Different atomizer wheel configurations, optimum atomizer speed and relevant feed properties yield desired results. The normal operational range is between 5,000 and 25,000 rpm but may be lower, e.g. 3,000 rpm, or higher, e.g. 35,000 rpm. The atomizer wheel typically has a diameter of 5 to 50 cm. Several types and sizes are available to handle products in the fields of dairy, fine chemicals, pharmaceutical, sanitary food processing, and heavy-duty chemical processing. The size range varies between a small air-driven laboratory unit which handles from 1-10 kg/h of liquid feed, to the largest commercial unit driven by 1,000 kW motors which can handle liquid feed in excess of 200 metric ton/hour. Rotation of the atomizer wheel may be provided by a drive motor coupled to a drive shaft, possibly via a gear transmission or a belt drive but the atomizer wheel may also be arranged in a direct drive.

Further, in one commercially available rotary atomizer, the F15D by GEA Process Engineering A/S, the atomizer wheel is driven directly via a shaft which in turn is supported by sealed bearings which are delivered in a greased condition. As the bearings are sealed, the lubricant is prevented from coming into contact with the product to be atomized. This is a particularly important feature in the processing of inter alia food, dairy products, and pharmaceuticals, in which a risk of contamination of the product is not acceptable.

In such rotary atomizers, the energy required to break up the liquid feed into droplets is provided by the rotation of the atomizer wheel brought about by the motor acting on the drive shaft or spindle. In turn, this means that a high speed is needed in order to provide the necessary energy. Although the above-mentioned rotary atomizers are all well-functioning and, if special precautions such as sealed bearings are taken, fulfill the requirements to no or only limited risk of contamination, great demands are posed on the bearings supporting the drive shaft, and the wear and tear of the bearings are underlined by factors such as local heating due to friction. In fact, even though great care is taken in the design of the bearings, and monitoring of the bearing temperature is optionally carried out, the expected lifespan of the bearings is limited. This may increase the amount of down-time to carry out additional monitoring and checking of the parts of the rotary atomizer in order to prevent break-down or damage to the atomizer itself or the production of an inferior product.

Apart from the foil bearings disclosed in EP 2 826 566 A1 rolling element bearings, such as ball bearings and roller bearings are known, and it is per se known to provide such rolling element bearings with dampers in the form of so-called squeeze film dampers comprising the features mentioned by way of introduction. Such rotary bearing with a damper is e.g. known from JP H 11141545 A that discloses a ball or roller bearing or a sliding bearing accommodated in a damper comprising a damper space which during operation is supplied with hydraulic fluid from an oil supply line.

U.S. Pat. No. 7,798,720 B1 discloses a squeeze film damper with highly variable support stiffness, comprising bellows defining bellow chambers that are connected to a pressure source and a squeeze film damper chamber is connected to another pressure source. The bellow chambers and the damper chamber are connected to their respective pressure-sources through control valves that can be used to regulate the pressure to the chambers.

Other squeeze film dampers are known from e.g. U.S. Pat. No. 7,517,152 B1, U.S. Pat. No. 4,992,024 A, KR 20010065634 A, KR 2018084634 A, and WO 2016022875 A2.

SUMMARY OF THE INVENTION

The present invention relates to a rotary bearing with a damper and with an axis of rotation, comprising: an inner bearing element; an outer bearing element coaxial with the inner bearing element, the inner bearing element configured for rotation around the axis of rotation relative to the outer bearing element; an inner damper element with an outer surface surrounding the outer bearing element; an outer damper element with an inner surface surrounding the inner damper element; at least one sealing element provided between the outer surface of the inner damper element and the inner surface of the outer damper element, said sealing element confining a damper space comprising at least a film space provided by a clearance between said outer surface and said inner surface, the damper space being at least partially filled with fluid.

The invention further relates to a motor and a rotary atomizer comprising such bearing with a damper, and to the use of such bearing with a damper.

It is an object of the present invention to provide a rotary bearing with a damper, which inter alia is usable in the processing of food, dairy products, and pharmaceuticals, in which contamination of the product, such as by lubrication oil, etc., is not acceptable.

As used herein, by "rotary bearing" should be understood an element to be positioned between two other elements to allow said two other elements to rotate relative to each other.

This is obtained by a rotary bearing with a damper of the kind mentioned by way of introduction in which said damper space is a closed, isolated damper space. Hereby is obtained that the fluid, e.g. oil and said fluid e.g. having a viscosity in the range of 30 to 50,000 cP, is during operation retained and isolated inside the damper space thus avoiding any risk of contamination thereby of products being processed e.g. by spray drying of products in food, dairy, or pharmaceutical industry. Further no conduits, valves, etc. are connected to the damper space eliminating any risk of fluid leaking from such components thereby adding to the avoidance of any risk of contamination of products being processed e.g. by spray drying of products in food, dairy, or pharmaceutical industry.

The inner and outer bearing elements are in an embodiment elements of a sealed bearing which is delivered in a greased condition, as mentioned above, especially in so-called life-time greased condition.

In an embodiment the inner and outer bearing elements are parts of a rolling element bearing, such as a ball bearing or a roller bearing.

In an embodiment the outer bearing element and the inner damper element are separate elements.

In another embodiment the outer bearing element and the inner damper element are integral.

In an embodiment two sealing elements are confining between them said damper space.

In an embodiment the film space is a circumferential film space encircling the inner damper element.

In an embodiment said damper space comprises at least two sections comprising said film space and a reservoir space adjacent the film space.

In a further embodiment the film space is a circumferential film space encircling the inner damper element, and the reservoir space comprises a circumferential part adjacent the circumferential film space. Thus, the two sealing elements confining the damper space likewise encircles, respectively, the inner bearing element.

In an embodiment the circumferential film space has the shape of or envelopes a circular cylinder surface, especially a right circular cylinder surface. In an embodiment the circumferential film space is coaxial with the inner and outer bearing elements.

In yet an embodiment the damper space is partially filled with liquid and partially filled with gas. By having the damper space partially filled with liquid and partially filled with gas provisions are in a convenient way, especially when a reservoir space is provided, made for absorbing any thermal expansion of the liquid during operation. Thus, the reservoir space may fulfill the function of an expansion tank or chamber allowing expansion of the liquid. It should be noted that the gas may be air or another gas or a mixture of gasses, possibly including air.

In an embodiment the inner damper element is configured to slide in a direction parallel to the axis of rotation relative to the outer damper element. Hereby provisions are made for absorbing e.g. linear thermal expansion in said direction e.g. of a shaft seated by means of the rotary bearing.

In a further embodiment the inner damper element is configured to slide in said direction against a bias, said bias being in yet an embodiment provided by at least one spring member. Thus in an embodiment the bias is configured to exceed any static friction force of the sealings, thereby providing for a sufficient and required axial preload direction and magnitude on e.g. a roller bearing or ball bearing, independent of possible thermal expansion of the shaft during operation.

In general, by the term "bias" should be understood a force acting as a preload on an element, such as the inner damper element.

While the inner damper element and the outer damper element are in an embodiment of the present invention configured to slide relative to each other in a direction of the axis of rotations, the inner damper element and the outer damper element are usually, substantially prevented from rotating relative to each other, as it is also the case in the prior art.

In a practical embodiment the damper space is provided with a closable filling port, and in a further practical embodiment the damper space is provided with a closable vent. One or both of the closable filling port and the closable vent may be closed by a plug, such as a screw plug.

In a practical embodiment the sealing elements are elastic elements and further in an embodiment the sealing elements are, in a mounted position, compressed by 5 to 40%, especially by 10 to 30%, relative to a relaxed position.

In an embodiment at least one of the sealing elements is of an elastic material, and in a further embodiment at least one of the sealing elements is an O-ring.

In a practical embodiment a stand-still pressure inside the damper space is atmospheric. During operation the temperature may rise due to viscous friction, bearing heat loss, external heat sources etc., and the pressure inside the damper space may rise correspondingly.

In an embodiment the clearance providing the circumferential film space is in the range of 10 to 2000 μm.

In an embodiment the bearing is configured for the inner bearing element to rotate at least at 1,000 rpm, especially at least at 6,000 rpm, and further especially at 12,000 to 80,000 rpm or at least up to 60,000 rpm. This makes the rotating bearing suitable for applications such as in rotary atomizers.

In an embodiment the axis of rotation is in an operating position vertical. This likewise makes the rotating bearing suitable for applications such as in rotary atomizers.

Further, according to the invention a rotary atomizer comprises a vertical spindle, an atomizer wheel at a lower end of the spindle, a motor at an upper end of the spindle, said motor comprising a rotor, rotary bearings supporting the spindle and the rotor of the motor, and at least one of said bearings is a rotary bearing with a damper, according to the invention. The motor rotor and the spindle may be coupled through a gear box, a coupling, or the motor rotor and the spindle may be provided by a common rotor and spindle shaft.

BRIEF DESCRIPTION OF THE DRAWINGS

In the following the invention will be explained in further detail by way of non-limiting examples of embodiments having reference to the accompanying drawings, in which.

DETAILED DESCRIPTION

Figure 1:
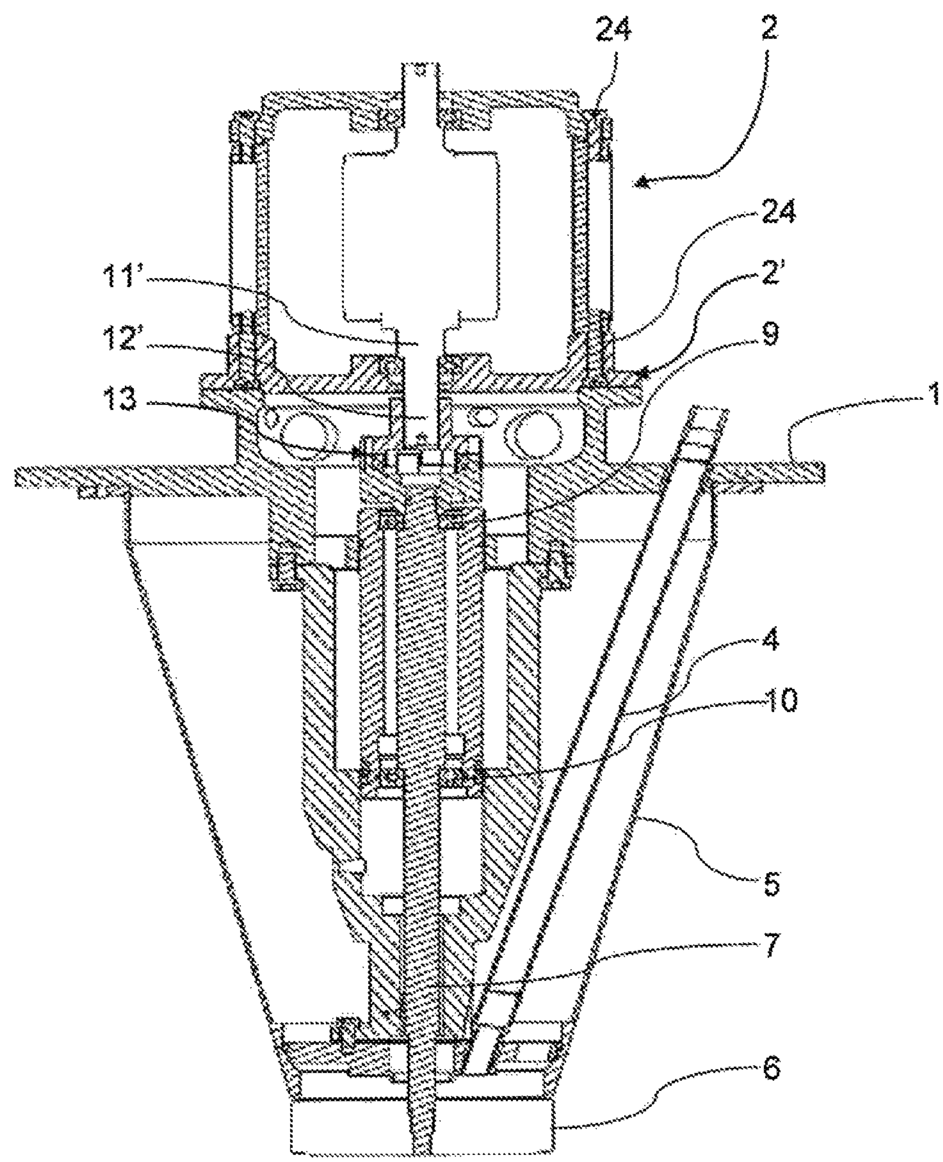
FIG. 1 shows a vertical section of a rotary atomizer.

FIG. 1 shows a rotary atomizer generally of prior art that may be provided with one or more rotary bearings according to the present invention. The rotary atomizer is designed for installation in the upper part of a spray drying chamber and comprises a support bracket 1 for connection with a ceiling wall of the spray drying chamber. The support bracket 1 supports a casing bottom 2' of a drive motor 2 e.g. in the form of a high frequency asynchronous electric motor. A feed pipe 4 for the supply of the product to be atomized extends downwards through a lower atomizer casing 5 to terminate at an atomizer wheel 6. The atomizer wheel 6 is secured at the lower end of a drive shaft 7 designed as a relatively slender solid spindle which is radially supported by bearings 9 and 10. The lower bearing 10 also serves as an axial support of the drive shaft or spindle 7. The motor 2 comprises a motor shaft 11', which at a lower shaft end 12' is connected to the drive shaft 7 through a coupling 13 comprising in a manner known per se an upper coupling part connected to the motor shaft 11' and a lower coupling part connected to the drive shaft 7.

Figure 2:
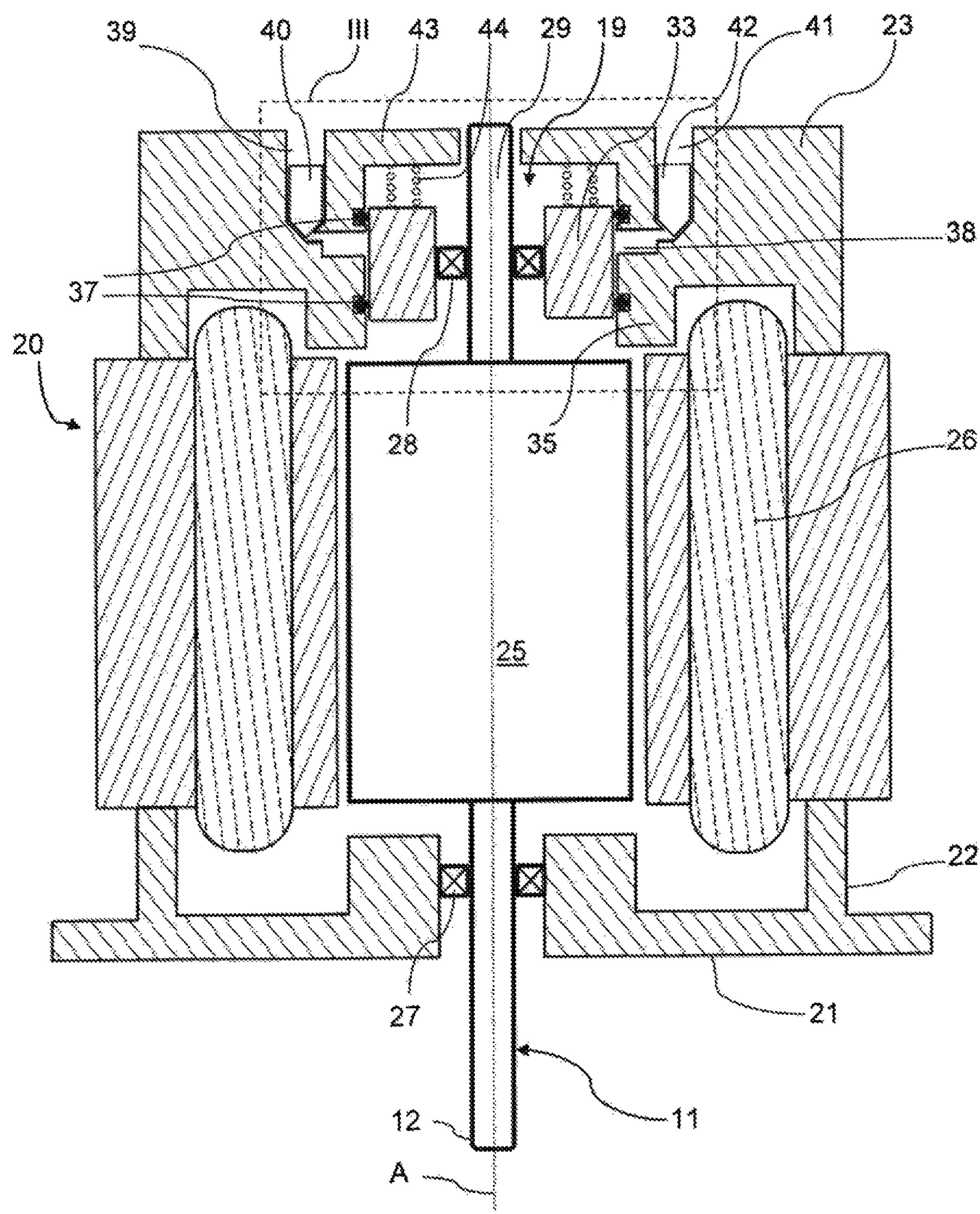
FIG. 2 shows a vertical section of an embodiment of a motor according to the invention for the rotary atomizer of FIG. 1.

FIG. 2 shows a drive motor 20 according to the present invention that may substitute the drive motor 2 shown in FIG. 1. Thus, the drive motor 20 comprises a motor shaft 11 with a lower shaft end 12 for connection to the coupling 13 shown in FIG. 1.

Further the drive motor 20 comprises a casing bottom 21 for connection to the support bracket 1, a generally cylindrical casing side part 22 and a casing top part 23. The casing bottom 21 and the casing top part 23 may e.g. be connected to the casing side part 22 by means of screws 24 (omitted in FIG. 3).

Figure 3:
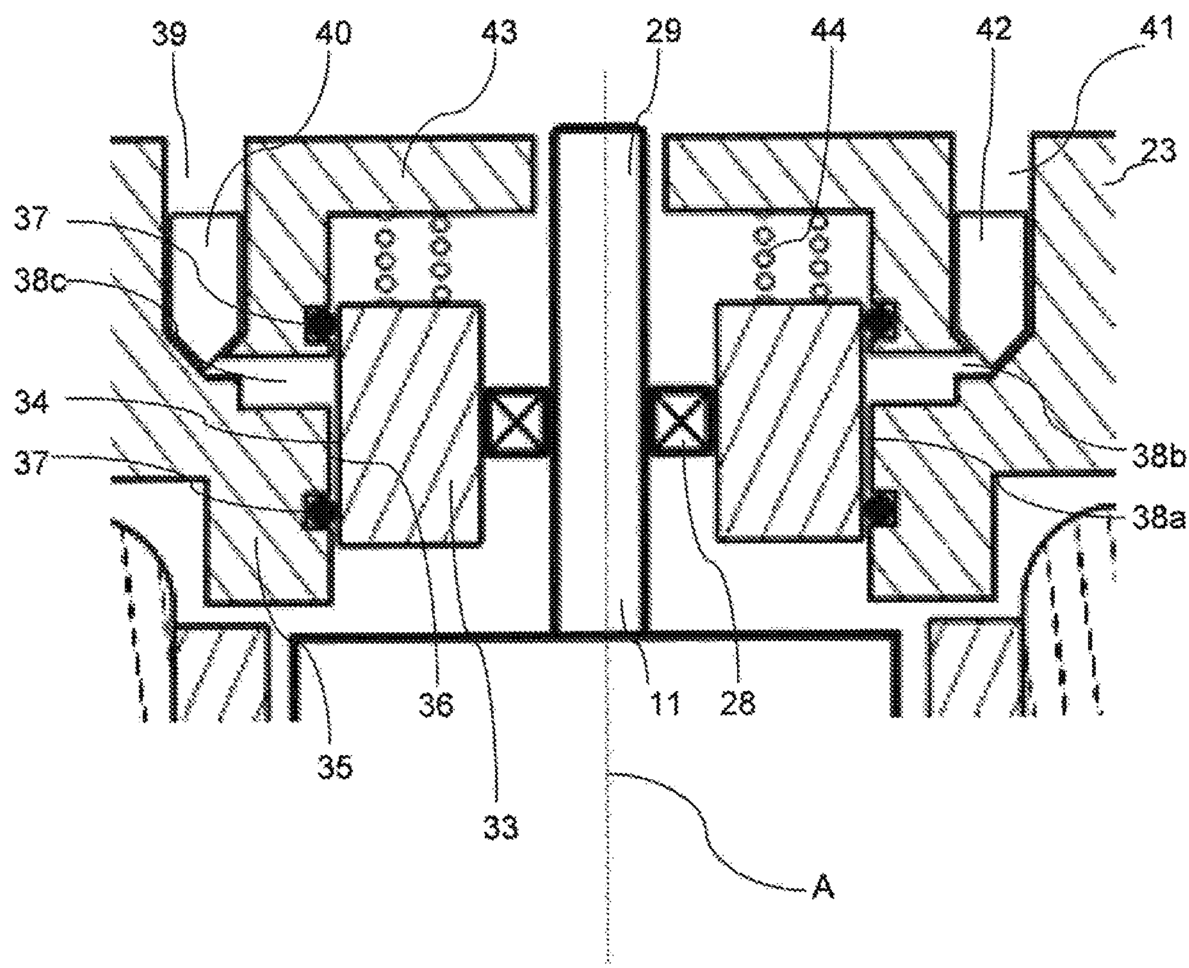
FIG. 3 shows an enlarged detail indicated by III of the motor shown in FIG. 2.

The motor shaft 11 has a vertical axis of rotation A and carries a rotor winding 25 that is surrounded by a stator winding 26 (se FIG. 3, omitted in FIG. 1). The motor shaft 11 is supported relative to the casing bottom 21 and the casing top part 23, respectively, through rolling element bearings, which in the embodiment shown are ball bearings 27, 28, but alternatively roller bearings might be used for one or both of these two bearings. Thus, lower ball bearing 27 is supports the lower shaft end 12 radially and axially relative to the casing bottom 21 and upper ball bearing 28 supports an upper shaft end 29 of the motor shaft 11 relative to the casing top part 23.

In the embodiment shown the upper ball bearing 28 is incorporated in a rotary bearing with a damper 19 according to the present invention as will be explained in the following having reference to FIGS. 3 and 4.

Figure 4:
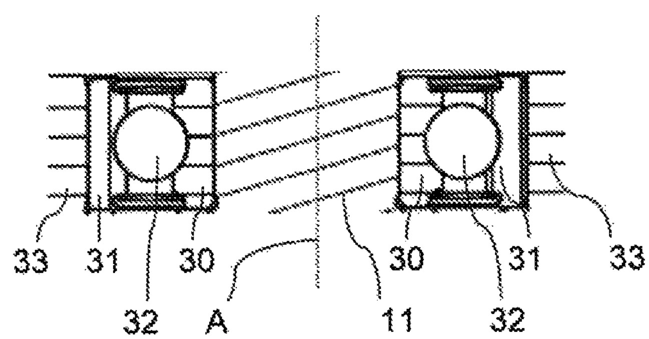
FIG. 4 shows an enlarged view of an embodiment of a bearing shown in FIG. 3.

FIGS. 3 and 4 show the upper shaft end 29 and a portion of the casing to part 23. The ball bearing 28 comprises an inner bearing element 30 seated on the upper shaft end 29, and configured for rotation around the axis of rotation A together with the motor shaft 11. An outer bearing element 31 is coaxial with the inner bearing element 30 and between these two bearing elements balls 32 are positioned as it is known in the art. The bearing 28 is sealed and greased as it is per se known in the art and thus the bearing is of the kind which is delivered in so-called life-time greased condition.

In the present embodiment the outer bearing element 31 is seated in an inner damper element 33 with an outer surface 34. Alternatively, the outer bearing element 31 might be an integral part of the inner damper element 33. An outer damper element 35 with an inner surface 36 is surrounding the inner damper element 33. In the present embodiment the outer damper element 35 is an integral part of the casing top part 23. Two sealing elements 37, which in the present embodiment are seals of elastic material, e.g. O-rings, are provided between the outer surface 34 of the inner damper element 33 and the inner surface 36 of the outer damper element 35. The sealing elements 37 are in the present embodiment mounted or seated in recesses in the inner surface 36 of the outer damper element 35 and abut against the outer surface 34 of the inner damper element, which in the present embodiment is cylindrical.

The sealing elements 37 are confining between them a damper space 38 with at least two sections comprising a, generally cylindrical, circumferential film space **38*a* defined by a clearance between the outer surface 34 of the inner damper element 33 and the inner surface 36 of the outer damper element 35, and a reservoir space 38*b* comprising at least a circumferential part 38*c* adjacent the circumferential film space 38*a*. The clearance providing the circumferential film space, i.e. the distance between the outer surface 34 and the inner surface 36**, is e.g. in the range of 10 to 2000 μm.

The damper space 38 is according to the present invention a closed, isolated damper space.

The reservoir space **38*b* is in the shown operating position extending above the circumferential film space 38*a*. The damper space 38 is provided with a closable filling port 39 constituted by a vertical bore. The filling port 39 is in the operating condition closed by a screw plug 40. Further, the damper space is provided with a closable vent 41 likewise constituted by a vertical bore and closed in the operating condition by a screw plug 42. In the present embodiment, in an operating condition the fluid contained in the damper space 38 is partially liquid such as oil e.g. with a viscosity in the range of 30 to 50,000 cP. To fill the liquid into the damper space the two screw plugs 40 and 42 are removed, the liquid is filled into the filling port 39 while air escapes through the vent 41. In the present embodiment the amount of liquid fills completely the circumferential film space 38*a* whereas the reservoir space 38*b* is only partially filled with liquid to contain also an amount of air, or other gas that may be vented in to the damper space 38**. The function of this amount of air will be explained below.

In the embodiment shown, the inner damper element 33 is configured to slide in a direction parallel to the axis of rotation A relative to the outer damper element 35. Thus the outer surface 34 of the inner damper element where the sealing elements 37 abut is smooth, preferably with surface roughness $R_a$ of e.g. 2.5 μm or less to allow the sealing elements to slide along the outer surface 34 parallel to the axis of rotation A.

The casing top part 23 is provided with a cover 43 and between said cover 43 and the inner damper element 33 a number of springs 44 are provided to bias the inner damper element 33 in a direction towards the casing bottom 21. Preferably the bias should be balanced around the axis of rotation A.

During operation the temperature of the drive motor 20 including the motor shaft 11 may rise and accordingly the motor shaft may be subject to thermal expansion or extension. Such extension will be absorbed by the inner damper element 33 rising against the force of the springs 44. When operation is stopped and the temperature drops, the thermal extension of the motor shaft 11 reverses. Due to the force or bias of the springs 44, the inner damper element 33 will correspondingly return to its original, lower position.

In order to close effectively the damper space 38, the sealing elements 37 are, in their mounted or seated condition, compressed by by 5 to 40%, especially by 10 to 30% relative to their relaxed conditions before mounting. Thus the dimension of the cross section of the sealing elements 37 between the outer surface 34 and the inner surface 36, in the mounted or seated condition shown in the figures, is reduced, in a radial direction relative to the axis of rotation A, to 60 to 95%, especially 70 to 90%, of the dimension in an unstressed or relaxed condition. Hereby it is secured that the liquid inside the damper space 38 does not leak during operation. Compressing the sealing elements 37 entails friction between the sealing elements 37 and the outer surface 34. In order to ensure that the inner damper element 33 returns to its original position after operation the spring force or bias of the springs 44 preferably exceed the static friction force between the sealing elements 37 and the outer surface 34.

Filling liquid into the damper space 38 as explained above entails that the pressure inside the damper space 38 immediately after filling in the liquid, i.e. a stand-still pressure, will be, at least approximately, atmospheric. During operation the rising temperature of the drive motor 20 may spread to the casing top part 23 including the outer damper element 35 and the liquid accommodated in the damper space 38. If the thermal expansion of said liquid is larger than the thermal expansion of the outer damper element 35 an excess expansion of the liquid may be absorbed by the amount gas or air like accommodated in the damper space 38, the pressure inside the damper space 38 rising correspondingly. Thus, this amount of gas or air fulfills the function of an expansion tank or chamber. The person skilled in the art will easily envisage other means of fulfilling the function of an expansion tank or chamber, and accordingly it is envisaged that the damper space 38 may be completely filled with liquid.

The motor shaft 11 and the drive shaft 7 of the rotary atomizer may be connected through the coupling 13 that provides for slight movement between the motor shaft 11 and the drive shaft 7 while ensuring a uniform speed of rotation of the two shafts. In one alternative the motor shaft and the drive shaft may be integral as disclosed in the above-mentioned EP 2 826 566 A1. In a second alternative the motor shaft and the drive shaft may be connected through a gearing whereby the motor during operation will run with a lower rotational speed than the drive shaft.

The bearing with the damper 19 may be used in configurations in which the inner bearing element 30 rotates at 1,000 rpm or more, such as 6,000 rpm or more, especially at 12,000 rpm or more e.g. at 40,000 to 60,000 rpm, and even up to 80,000 rpm.

During rotation of an element seated by means of a bearing with a damper according to the present invention vibrations will occur, especial at specific speeds of rotation, known in the art as critical speeds of rotation. Using a damper, it is possible to accelerate a rotating element to pass at least some critical speeds to run the element at a higher rotational speed than said critical speeds, the vibrations that would normally occur at said critical speed being damped to an acceptable level.

When damping vibrations, the inner damper element 30 of the present invention will move (slightly) in radial directions perpendicular to the axis of rotation A in relation to the outer damper element 31. During these movements the clearance between the outer surface 34 and the inner surface 36 will increase and decrease in an oscillating manner and the volume between the outer surface 34 and the inner surface 36 within a given angular area around the axis of rotation A will increase and decrease accordingly. In the present embodiment where at least part of the fluid present in the damper space 38 is a liquid, this increasing and decreasing of the clearance at specific angular positions or areas will force the liquid present in the circumferential space **38*a* to move and some of the liquid will move circumferentially around the axis of rotation A (referred to as "squeeze film effect"), but some of the liquid may at some angular position relative to the axis of rotation A be forced into the adjacent circumferential part 38*c* of the reservoir space 38*b* entailing a shortage of liquid at angular positions opposite to the first mentioned angular positions. Such shortage may correspondingly be replenished from the adjacent circumferential part 38*c* of the reservoir space 38*b*, at least part of said reservoir space 38*b* extending above the circumferential film space 38*a*** to provide a (slightly) higher potential energy of the liquid present in the circumferential part of the reservoir space than of the liquid present in the circumferential film space.

It is noted that while in the embodiment shown in FIGS. 1-3, the inner damper element 33 and the outer damper element 35 are configured to slide relative to each other in a direction of the axis of rotations, and the inner damper element 33 and the outer damper element 35 are capable of minor radial shifts relative to each other as described above, the inner damper element 33 and the outer damper element 35 are substantially prevented from rotating relative to each other by means not shown. Such means will be obvious to the person skilled in the art of so-called squeeze film dampers.

What is claimed is:

1. A rotary bearing, comprising:
- an inner bearing element;
- an outer bearing element coaxial with the inner bearing element, the inner bearing element configured for rotation around an axis of rotation of the rotary bearing and relative to the outer bearing element;
- an inner damper element surrounding the outer bearing element;
- an outer damper element surrounding the inner damper element; and
- at least one sealing element provided between an outer surface of the inner damper element and an inner surface of the outer damper element, the sealing element confining a damper space comprising at least a film space provided by a clearance between the outer surface and the inner surface, the damper space being at least partially filled with fluid,
- wherein in an operating condition the damper space is a closed, isolated damper space,
- wherein the damper space is provided with a closable filling port, and
- wherein the damper space is partially filled with liquid and partially filled with gas.

2. The rotary bearing according to claim 1, wherein the closable filling port is closed by a plug.

3. The rotary bearing according to claim 1, wherein the damper space is confined between two sealing elements.

4. The rotary bearing according to claim 1, wherein the film space is a circumferential film space encircling the inner damper element.

5. The rotary bearing according to claim 1, wherein the damper space comprises at least two sections comprising the film space and a reservoir space adjacent the film space.

6. The rotary bearing according to claim 5, wherein the film space is a circumferential film space encircling the inner damper element, and the reservoir space comprises a circumferential part adjacent the circumferential film space.

7. The rotary bearing according to claim 1, wherein the inner damper element is configured to slide in a direction parallel to the axis of rotation relative to the outer damper element.

8. The rotary bearing according to claim 7, wherein the inner damper element is configured to slide in the direction against a bias.

9. The rotary bearing according to claim 8, wherein the bias is provided by at least one spring member.

10. The rotary bearing according to claim 1, wherein the damper space is provided with a closable vent.

11. The rotary bearing according to claim 1, wherein the sealing elements are compressed by one of 5 to 40%; and 10 to 30%.

12. The rotary bearing according to claim 1, wherein at least one of the sealing elements is of an elastic material.

13. The rotary bearing according to claim 1, wherein a stand-still pressure inside the damper space is atmospheric.

14. The rotary bearing according to claim 1, wherein the clearance providing the circumferential film space is in the range of 10 to 2000 μm.

15. The rotary bearing according to claim 1, wherein the bearing is configured for the inner bearing element to rotate at 6,000 to 80,000 rpm.

16. The rotary bearing according to claim 1, wherein the axis of rotation in an operating position is vertical.

17. The rotary bearing according to claim 1, wherein the rotary bearing supports an element configured to rotate at 1,000 to 80,000 rpm.

18. The rotary bearing according to claim 1, wherein the inner damper element, the outer damper element, and the at least one sealing element constitute a damper of the rotary bearing.

19. A motor comprising a rotary bearing, the rotary bearing comprising:

an inner bearing element;

an outer bearing element coaxial with the inner bearing element, the inner bearing element configured for rotation around an axis of rotation of the rotary bearing and relative to the outer bearing element;

an inner damper element surrounding the outer bearing element;

an outer damper element surrounding the inner damper element; and at least one sealing element provided between an outer surface of the inner damper element and an inner surface of the outer damper element, the sealing element confining a damper space comprising at least a film space provided by a clearance between the outer surface and the inner surface, the damper space being at least partially filled with fluid, wherein in an operating condition the damper space is a closed, isolated damper space, wherein the damper space is provided with a closable filling port, and wherein the damper space is partially filled with liquid and partially filled with gas.

20. The motor according to claim 19, wherein the inner damper element, the outer damper element, and the at least one sealing element constitute a damper of the rotary bearing.

21. A rotary atomizer comprising at least one rotary bearing, the at least one rotary bearing comprising:

an inner bearing element;

an outer bearing element coaxial with the inner bearing element, the inner bearing element configured for rotation around an axis of rotation of the at least one rotary bearing and relative to the outer bearing element;

an inner damper element surrounding the outer bearing element;

an outer damper element surrounding the inner damper element; and at least one sealing element provided between an outer surface of the inner damper element and an inner surface of the outer damper element, the sealing element confining a damper space comprising at least a film space provided by a clearance between the outer surface and the inner surface, the damper space being at least partially filled with fluid, wherein in an operating condition the damper space is a closed, isolated damper space, and wherein the damper space is provided with a closable filling port, and wherein the damper space is partially filled with liquid and partially filled with gas.

22. The rotary atomizer according to claim 21, further comprising a vertical spindle, an atomizer wheel at a lower end of the vertical spindle, and a motor at an upper end of the vertical spindle, wherein the motor comprises a rotor and rotary bearings supporting the vertical spindle and the rotor, and wherein at least one of the rotary bearings is one of the at least one rotary bearing.

23. The rotary atomizer according to claim 21, wherein the inner damper element, the outer damper, and the at least one sealing element constitute a damper of the rotary bearing.

* * * * *